110-295

XR RE 5,398 BEST AVAILABLE COPY

ADDED

SUBSTITUTE FOR CROSS REFERENCE XR

G. W. LASCELL.

Improvement in Steam-Boilers and Furnaces.

RE No. 5,398.

Reissued May 6, 1873.

Witnesses:

A. W. Almquist

R. G. Graham

Inventor:

George W. Lascell

Munn & Co.

Attorneys

UNITED STATES PATENT OFFICE.

GEORGE W. LASCELL, OF SYRACUSE, NEW YORK, ASSIGNOR TO HIMSELF AND HUGH ROBINSON, OF JERSEY CITY, NEW JERSEY.

IMPROVEMENT IN STEAM-BOILERS AND FURNACES.

Specification forming part of Letters Patent No. 133,161, dated November 19, 1872; reissue No. 5,398, dated May 6, 1873; application filed March 24, 1873.

*To all whom it may concern:*

Figure 1:
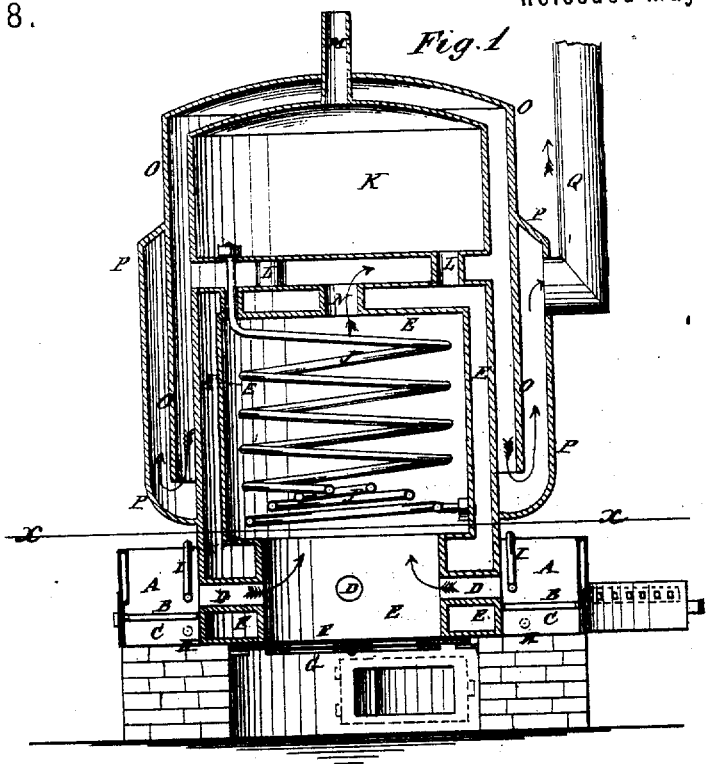
Figure 2:
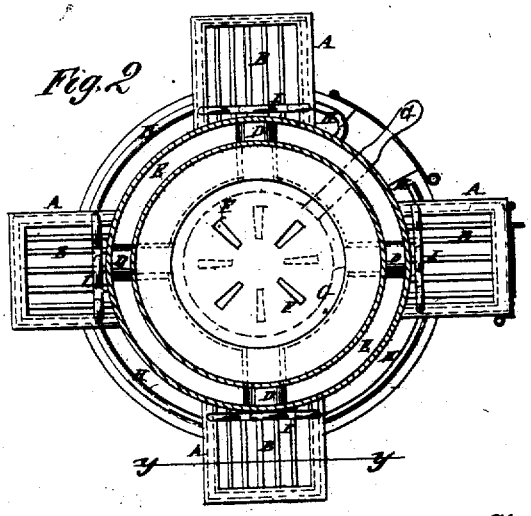
Figure 3:
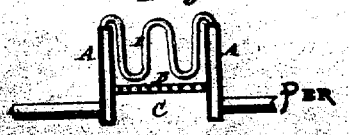

Be it known that I, GEORGE W. LASCELL, of Syracuse, in the county of Onondaga and State of New York, have invented a new and useful Improvement in Steam-Boilers and Furnaces, of which the following is a specification:

Figure 1 is a detail vertical section of a steam-boiler and furnace illustrating my invention. Fig. 2 is a horizontal section of the same taken through the line *x x* in Fig. 1. Fig. 3 is a detail vertical section of one of the fire-chambers taken through the line *y y* in Fig. 2.

Similar letters of reference indicate corresponding parts.

My invention has for its general object to furnish an improved boiler and furnace for generating steam, and for heating and evaporating purposes, which shall be so constructed as to consume all the smoke and combustible gases that may be developed in the combustion of the fuel, and which shall, at the same time, be simple in construction, and of greater steam-generating, heating, or evaporating power than boilers and furnaces constructed in the ordinary manner. The invention consists in the construction and certain combinations of various parts, as hereinafter more fully described, including a number of fire boxes or chambers arranged around the outside of the lower part of the boiler or body to be heated, and in communication by flues with a central or intermediate well where the flame and unconsumed gases from the outside fire-chambers meet and are charged with oxygen through a register or air-valve in or near the bottom of said well. This latter arrangement or combination provides for a steady uniform feed of the fuel without interfering with the boiler or body surface to be heated, and admits of a readily-controllable supply of air or oxygen to the flame and escaping gases in the well to produce perfect combustion, said flame and gases flowing, as through a series of blow-pipes, from the bottoms of the outside fire-chambers into the interior well, and, by the combustion of said gases in the latter, causing the smoke to be consumed and great economy of fuel to be obtained.

A represents the fire-chambers, four (more or less) of which may be used, and which are placed around the lower part of the boiler or other object to be heated. The lower part of the fire-chamber A is provided with a grate, B, to support the fuel, and with an ash-pit, C, to receive the ashes of the consumed fuel. The tops of the fire-chambers A are left open, as shown, and the air to support the combustion passes in through the said open tops, and passes down through the dead coal to the live coal in the lower part of said chambers A, where the combustion takes place. The smoke and gaseous products of combustion pass through openings or flues D in the side of the lower part of the boiler E, where they mix with air entering through perforations in the bottom F, and are consumed. The perforations in the bottom F are closed or opened to any desired extent by means of a register or damper, G. The walls of the boiler E may be made double to form a water-space, into the lower part of which the water is introduced. The walls of the fire-chambers A are also represented as made double to form water-spaces. The water-spaces between the double walls of the fire-chambers A are connected by pipes H, into one of which the water is introduced from the pump or reservoir. The other end of the pipe H, that is broken to connect with the pump or reservoir, is connected with the space between the double walls of the boiler E, so that the water, before passing into the boiler E, circulates around all the fire-chambers A. The spaces between the double walls, upon the opposite sides of each fire-chamber, are connected by pipes I, which are coiled or zig-zagged across the inner ends of said chambers, so as to be exposed to the heated products of combustion as they pass from said chambers into the interior of the boiler E. The water-space between the double walls of the boiler E is made wider at the lower than at the upper part of said boiler to form a contracted well or chamber, into which the smoke and other combustible gaseous products of combustion from the fire-chambers A are introduced, and in which they are burned by the aid of the air introduced through the openings in the bottom F of the boiler, which openings are regulated by the damper G, to introduce exactly the amount of air required to effect their thorough combustion. J is a water-pipe, the lower part of which is coiled, as shown in Fig. 1, to form a dome-shaped partition at the top of the contracted part or combustion-well in which the gases are consumed, which dome-shaped coil, in a measure, checks the ascent of the smoke and gases and secures their perfect combustion. The upper part of the pipe J may be coiled or arranged in any desired manner.

To prevent the pipe J from being made so long that the water cannot circulate through it properly, it may be made in several parts or distinct coils. The lower end of the pipe or pipes J is connected with the lower part of the water-space between the double walls of the boiler E, and the upper end of said pipe or pipes is connected with the water-space in the double-walled top of said boiler; or, if desired, it may pass up into and be combined with the dome or steam-chest K. The dome or steam-chest K is supported by a number of short pipes or hollow studs, L, the lower ends of which are connected with the water-space in the double-walled top of the boiler E, and their upper ends are connected with the said dome or steam-chest K, between the bottom of which and the top of the boiler E a space is thus left, as shown in Fig. 1. The steam is conducted away through the pipe M. The incombustible products of combustion pass up through short pipes N inserted in the double-walled top of the boiler E into the space between the said top and the bottom of the dome K, whence they pass into the space inclosed by the jacket O, which incloses the dome K, and projects down along the sides of the boiler E. The lower end of the jacket O is left open, and is surrounded by a jacket, P, which incloses the lower part of the jacket O and extends up so as to overlap the lower part of the dome K. The bottom and the top of the jacket P are closed, and the incombustible products of combustion escape from its upper part into the flue Q.

By this construction the combustible parts of the fuel will be wholly consumed, and the heat thus developed will be almost entirely utilized in heating the water in the boiler, producing the best possible results with a given quantity of fuel. Furnace-doors requiring to be opened when it is necessary to renew the fuel may also be dispensed with, and the coal or fuel be shoveled into the open tops of the fire-chambers A. Such construction or arrangement of the fire-chambers A is equally applicable to cooking and other stoves, to heaters, furnaces, salt-blocks, &c.

I have no interior combustion-chambers nor openings leading thereto, through which to convey the coal. My fire boxes or chambers are wholly upon the outside of the outer shell of the boiler. Combustion of the fuel therefore takes place upon the outside only, and the products of such combustion are conveyed through openings or flues to the interior contracted or combustion well, where the flame and unconsumed gases or products of combustion from the fire-boxes A meet and are charged with oxygen through the register in the bottom of said well. The space usually taken up with the fire I devote entirely to heating-surfaces.

To effect perfect combustion on a large scale it is only necessary to have a steady and uniform feed as the first requisite; as the second, the admission of the proper supply of oxygen and in the right place. I deem it advisable to leave the covers off the fire-chambers A, because I wish the draft to be downward through the coal; but I also provide draft-holes at the bottom of the fire-boxes in front and just above the grates, and may also admit air through the ash-pit to the grates, if necessary.

What is here claimed, and desired to be secured by Letters Patent, is—

1. The combination of the outside fire-chambers A and flues D thereof with a central or intermediate well for combustion of the gaseous products and the register G, arranged in relation with each other and with the boiler surface above or body to be heated, substantially as specified.

2. The combination, with the outside fire-chambers A, the flues D, the central or intermediate combustion-well and the register G, of the double-walled boiler E, arranged to form a water-space around said well and flues D, connecting the latter with the fire-chambers, essentially as shown and described.

3. The combination of the pipes L, dome K, pipes N, and jackets O and P with the double-walled boiler E, coiled pipe or pipes J, and one or more exterior fire-chambers or furnaces, A, substantially as herein shown, and for the purpose set forth.

4. The combination of the pipes H with the double-walled exterior open-topped fire-chambers A and with the double-walled boiler E, substantially as herein shown and described, and for the purpose set forth.

5. The combination of the coiled or zigzag pipes I with the double-walled exterior open-topped fire-chambers A and with the flues D leading through the double walls of the boiler E, substantially as herein shown and described, and for the purpose set forth.

G. W. LASCELL.

Witnesses:
FRED. HAYNES,
D. MISELL.